(12) United States Patent
Jacobs

(10) Patent No.: US 10,960,504 B2
(45) Date of Patent: Mar. 30, 2021

(54) ROTATING MILL VISE JAWS

(71) Applicant: Danny Jacobs, Falkville, AL (US)

(72) Inventor: Danny Jacobs, Falkville, AL (US)

( * ) Notice: Subject to any disclaimer, the term of this patent is extended or adjusted under 35 U.S.C. 154(b) by 0 days.

(21) Appl. No.: 16/602,914

(22) Filed: Dec. 23, 2019

(65) Prior Publication Data

US 2020/0139498 A1 May 7, 2020

Related U.S. Application Data

(62) Division of application No. 15/731,071, filed on Apr. 14, 2017, now Pat. No. 10,576,592.

(51) Int. Cl.
*B23Q 3/06* (2006.01)
*B25B 1/24* (2006.01)
*B23Q 3/10* (2006.01)

(52) U.S. Cl.
CPC ............. *B23Q 3/066* (2013.01); *B23Q 3/062* (2013.01); *B23Q 3/103* (2013.01); *B25B 1/2436* (2013.01); *B25B 1/2442* (2013.01)

(58) Field of Classification Search
CPC .......... B25B 1/24; B25B 1/20; B25B 1/2415; B25B 1/2494; B25B 5/16; B25B 1/2452; B25B 5/163; B25B 5/166
USPC .................................. 269/262, 43, 271, 156
See application file for complete search history.

(56) References Cited

U.S. PATENT DOCUMENTS

| 92,331 A | * | 7/1869 | Mason | ................... B25B 1/2426 269/261 |
| 133,198 A | * | 11/1872 | Butler | ................... B25B 1/2452 269/262 |

FOREIGN PATENT DOCUMENTS

DE 10063988 A1 * 7/2001 ............. B25B 5/103

OTHER PUBLICATIONS

See attached foreign translation. (Year: 2001).*

* cited by examiner

*Primary Examiner* — Tyrone V Hall, Jr.
*Assistant Examiner* — Abbie E Quann

(57) ABSTRACT

A vise jaw combination used with a milling machine vise to hold a work-piece having either parallel edges or non-parallel edges. Wherein, the milling machine vise in this application disposes at least one movable member having threaded holes cooperating with fasteners to join the movable member and the vise jaw combination comprising a vertical axis tool post and a rotatable vise jaw. Wherein, the vertical axis tool post comprises a detachable wall disposing correlative thru holes for cooperating with the threaded holes and fasteners disposed at the movable member, whereby the vertical axis tool post is joined to the movable member disposed at the milling machine vise. Wherein, the rotatable vise jaw consists of a one-piece structure disposing a thru hole for receiving a vertical shaft disposed at the vertical axis tool post, whereby the rotatable vise jaw is joined to the vertical axis tool post.

7 Claims, 5 Drawing Sheets

ROTATING MILL VISE JAWS

CROSS-REFERENCE TO RELATED APPLICATIONS

This application is a divisional of U.S. patent application Ser. No. 15/731,071, filed on Apr. 14, 2017, which claims the benefit of U.S. Provisional Application No. 62/391,267, filed Apr. 25, 2016.

BACKGROUND OF THE INVENTION

This invention relates to milling machine vises and particularly to the clamping jaws used in combination with these vises. At present, the opposing jaws remain parallel at their clamping faces so that they provide adequate clamping pressure for holding a work-piece having parallel edges. However, the present jaws do not provide adequate clamping pressure for holding a work-piece having a beveled edge, whereas the parallel clamping faces cannot align with the non-parallel edges of a beveled work-piece.

Accordingly, it is an object of this invention to provide a vise jaw combination used with a milling machine vise to hold a work-piece having either parallel edges or non-parallel edges. Wherein, the milling machine vise in this application disposes at least one movable member having threaded holes cooperating with fasteners to join the movable member and the vise jaw combination comprising a vertical axis tool post and a rotatable vise jaw. Wherein, the vertical axis tool post comprises a detachable wall disposing correlative thru holes for cooperating with the threaded holes and fasteners disposed at the movable member, whereby the vertical axis tool post is joined to the movable member disposed at the milling machine vise. Wherein, the rotatable vise jaw consists of a one-piece structure disposing a thru hole for receiving a vertical shaft disposed at the vertical axis tool post, whereby the rotatable vise jaw is joined to the vertical axis tool post.

DETAILED DESCRIPTION OF THE INVENTION

Figure 1:
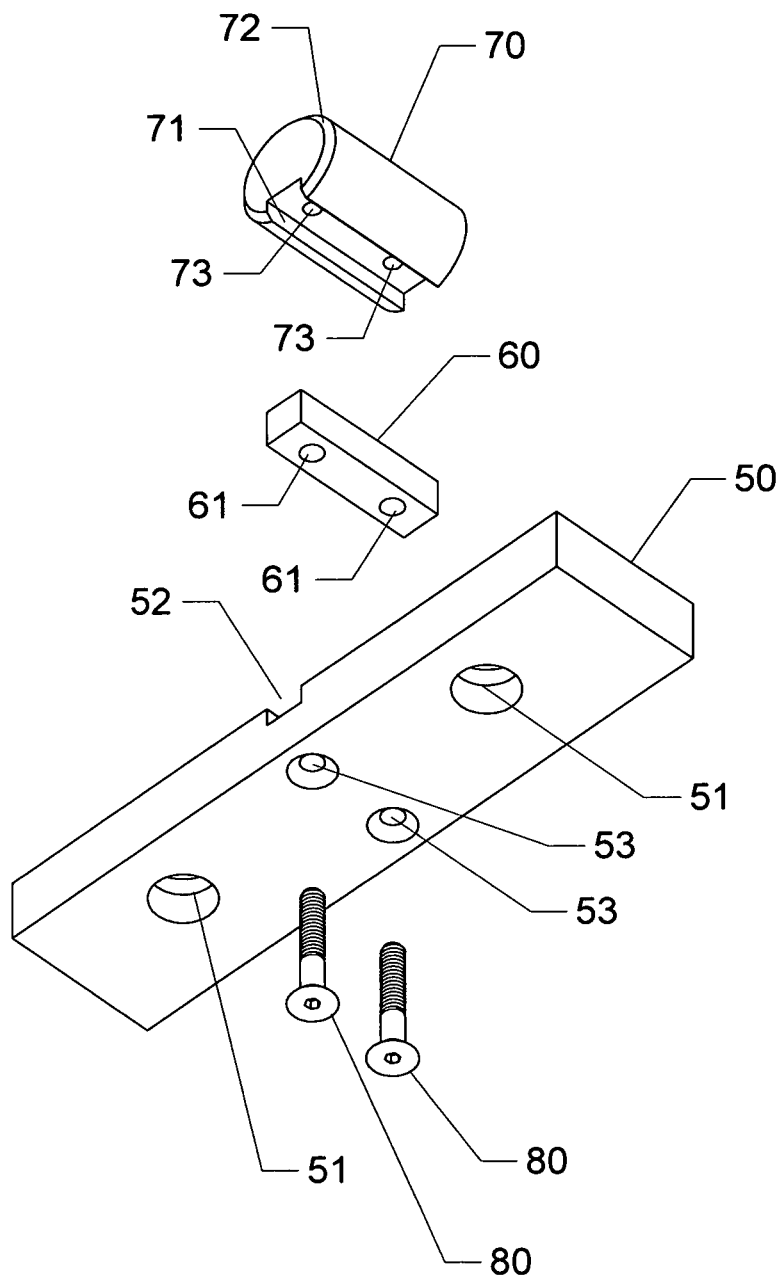
FIG. 1 is an exploded view of the vertical axis tool post assembly.
Figure 3:
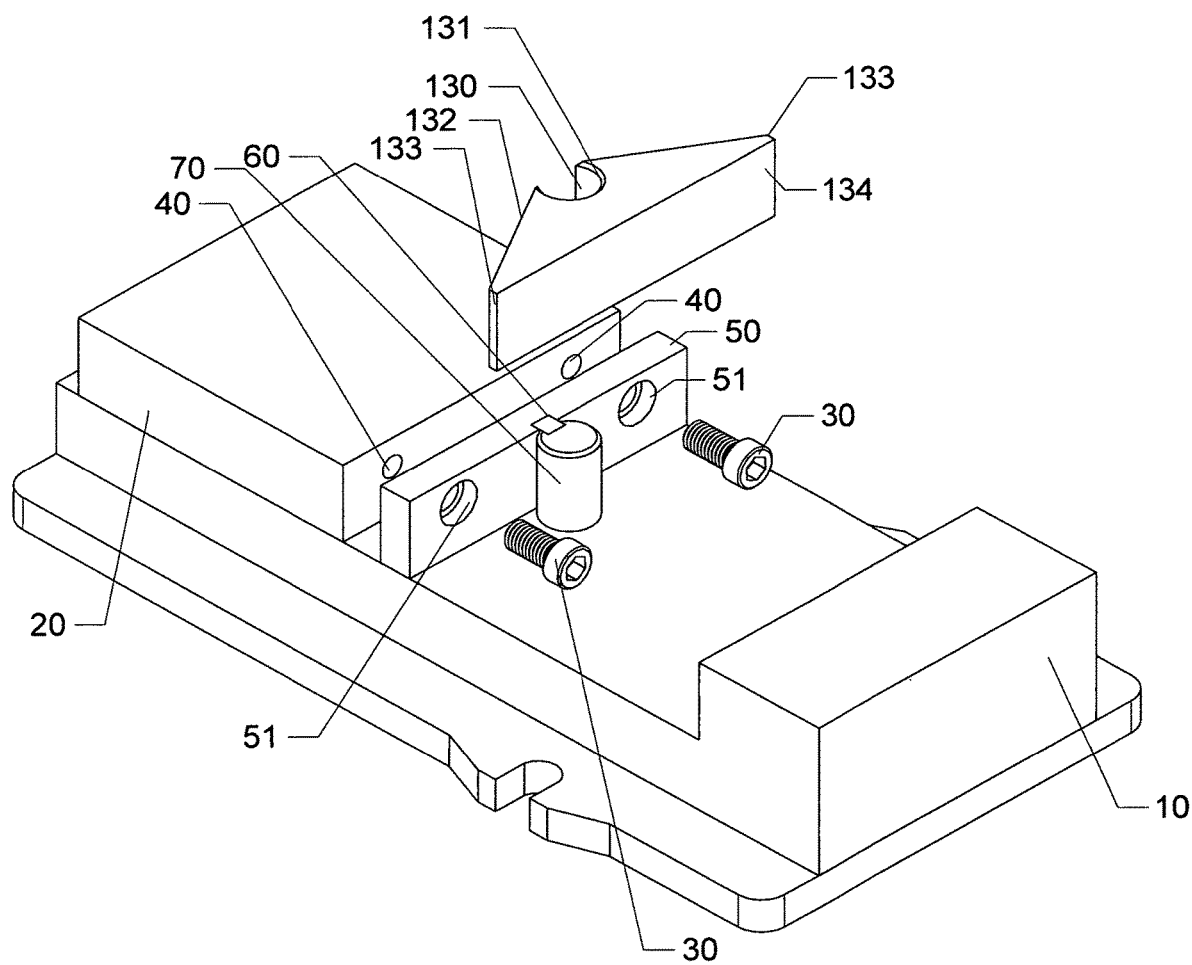
FIG. 3 is an isometric view showing the vertical axis tool post and the rotatable vise jaw separated from a milling machine vise having a movable member.

Referring to FIG. 1 and FIG. 3, the vertical axis tool post comprises a detachable wall 50, a vertical support member 60, and a vertical shaft 70 joined together using fasteners 80 cooperating with holes 53, 61, and 73. To maximize joint strength, wall 50 and vertical shaft 70 have corresponding grooves 52 and 71 for receiving vertical support member 60. Detachable wall 50 disposes thru holes 51 for cooperating with fasteners 30 and threaded holes 40 to join the vertical axis tool post and movable member 20 disposed at milling machine vise 10. Vertical shaft 70 cooperates with thru hole 130 to join the vertical axis tool post and the rotatable vise jaw. Chamfered edges 72 and 131 facilitate connection of the vertical axis tool post and the rotatable vise jaw.

Figure 2:
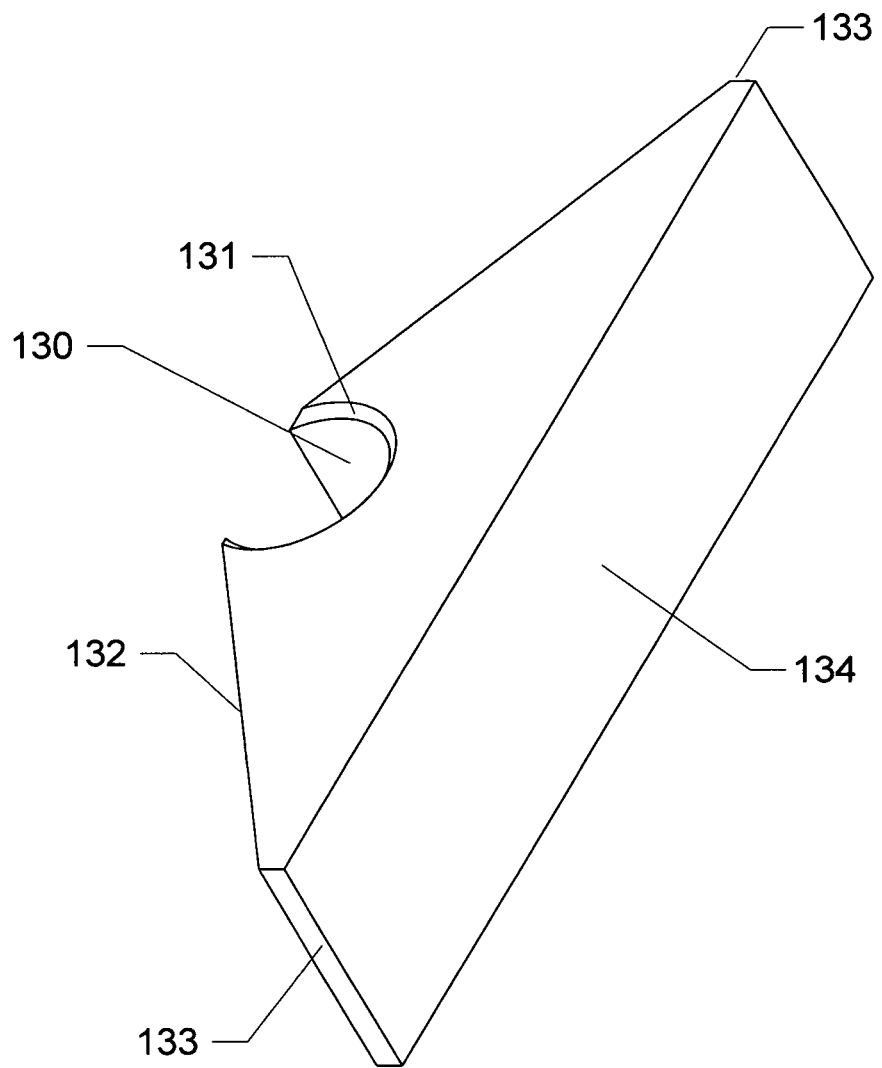
FIG. 2 is an isometric view of the rotatable vise jaw.

Referring to FIG. 2 and FIG. 3, the rotatable vise jaw consists of a one-piece structure having a thru hole 130 configured to slide over shaft 70. Chamfered edges 131 and 72 facilitate connection of the rotatable vise jaw and the vertical axis tool post. Beveled walls 132 are configured so that the vise jaw is rotatable either clockwise or counter clockwise about shaft 70 until beveled edge 132 rest against detachable wall 50. Reference number 133 are opposing shoulders to break sharp edges and reinforce clamping face 134.

Figure 4:
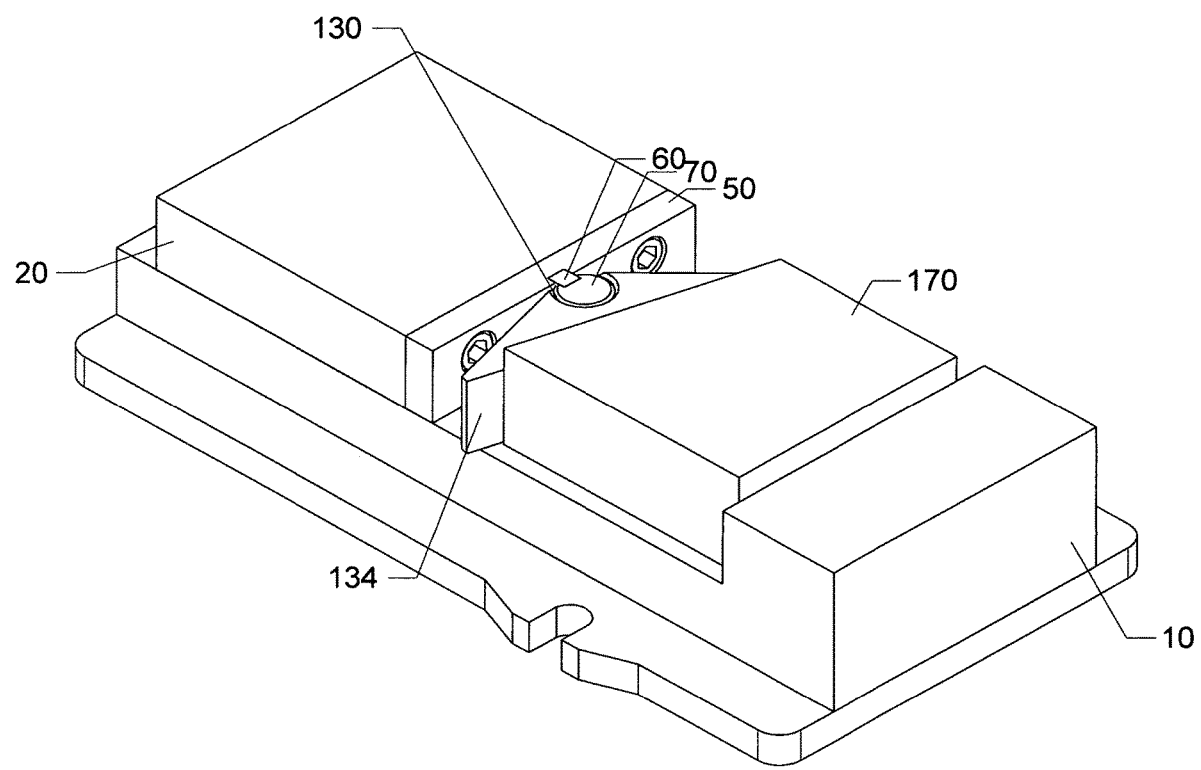
FIG. 4 is an isometric view showing the vise jaw combination used with a milling machine vise to hold a work-piece having non-parallel edges.

Referring to FIG. 3 and FIG. 4, the vise jaw combination is joined to movable member 20 using fasteners 30 and holes 40 and 51. FIG. 4 shows the vise jaw combination used with milling machine vise 10 to hold a work-piece 170 having non-parallel edges.

Figure 5:
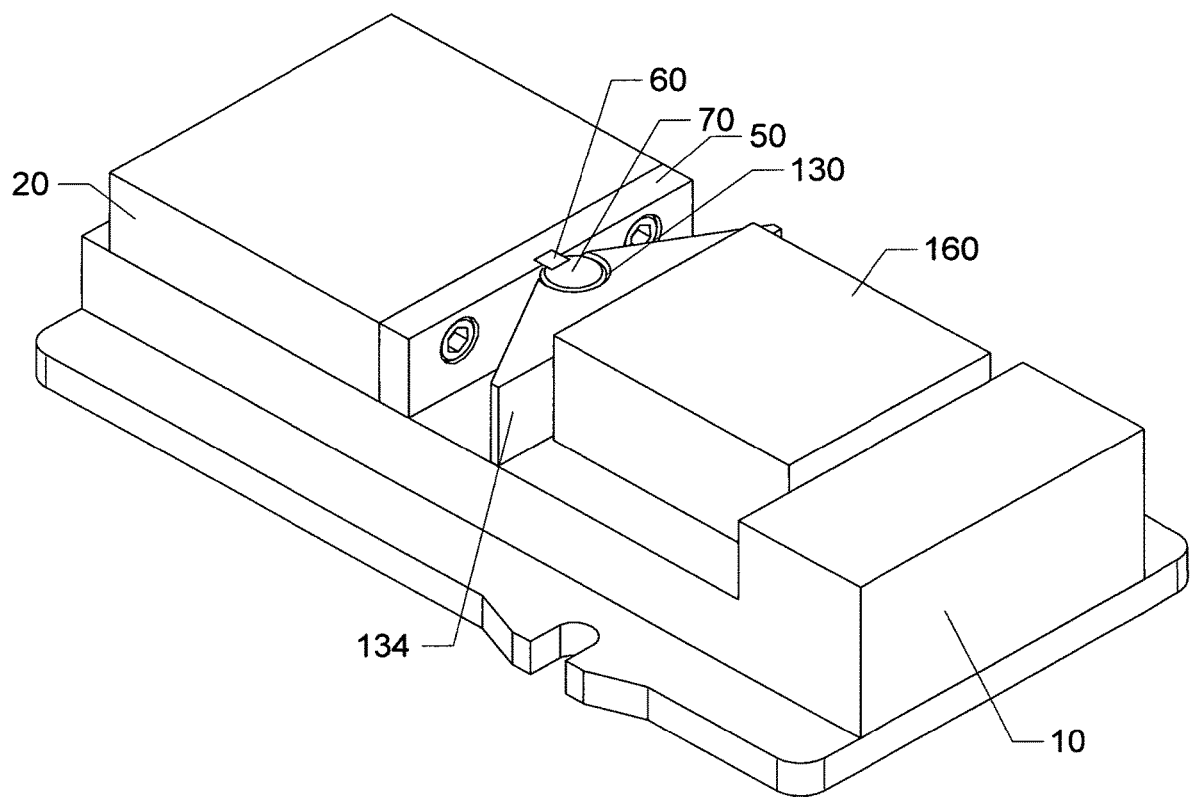
FIG. 5 is an isometric view showing the vise jaw combination used with a milling machine vise to hold a work-piece having parallel edges.

Referring to FIG. 3 and FIG. 5, the vise jaw combination is joined to movable member 20 using fasteners 30 and holes 40 and 51. FIG. 5 shows the vise jaw combination used with milling machine vise 10 to hold a work-piece 160 having parallel edges.

In conclusion of the detailed description of the invention, it should be noted that while there has been shown and described a preferred embodiment of the invention, it is understood that changes in structure, size, and materials can be made by those skilled in the art without departing from the improvements and advantages defined in the following claims:

I claim:

1. A vise jaw combination used with a milling machine vise to hold a work-piece having either parallel edges or non-parallel edges, wherein said milling machine vise has at least one movable member disposing threaded holes for cooperating with fasteners to join said movable member and said vise jaw combination comprising first and second elements;

wherein said first element comprises: A vertical axis tool post comprising a detachable wall disposing a vertical support member and vertical shaft, wherein said detachable wall and said vertical shaft have corresponding grooves for receiving said vertical support member;

said detachable wall, said vertical support member, and said vertical shaft each have correlative holes cooperating with fasteners to join said detachable wall, said vertical support member, and said vertical shaft;

wherein said vertical shaft is adapted to slide inside a thru hole disposed on said second element comprising:

A rotatable vise jaw consisting of a one-piece structure and said thru hole disposed on said rotatable vise jaw, wherein said vertical shaft comprises a vertical longitudinal axis and wherein said thru hole disposed on said rotatable vise jaw is configured to slide along parallel to said vertical longitudinal axis, whereby said rotatable vise jaw is joined to said vertical axis tool post and is rotatable about said vertical shaft.

2. The tool of claim 1, wherein said detachable wall disposes correlative thru holes for cooperating with said threaded holes and said fasteners to join said vise jaw combination and said movable member disposed at said milling machine vise.

3. The tool of claim 1, wherein said vertical shaft is adapted to slide inside said thru hole disposed at said rotatable vise jaw, whereby said rotatable vise jaw is joined to said vertical axis tool post.

4. The tool of claim 1, wherein said thru hole disposed at said rotatable vise jaw is configured so that said rotatable vise jaw slides past said vertical shaft connected to said detachable wall.

5. The tool of claim 1, wherein said rotatable vise jaw is configured to rotate clockwise about said vertical shaft until said rotatable vise jaw rests against said detachable wall.

6. The tool of claim 1, wherein said rotatable vise jaw is configured to rotate counter clockwise about said vertical shaft until said rotatable vise jaw rests against said detachable wall.

7. The tool of claim 1, wherein said thru hole disposed at said rotatable vise jaw is configured so that said rotatable vise jaw slides over said vertical shaft until said rotatable vise jaw rests against said milling machine vise.

\* \* \* \* \*